March 1, 1966  J. SCHAUBE  3,238,380
POWER END STAGES IN ADJUSTING MEMBERS OF CONTROLS
Filed March 21, 1963
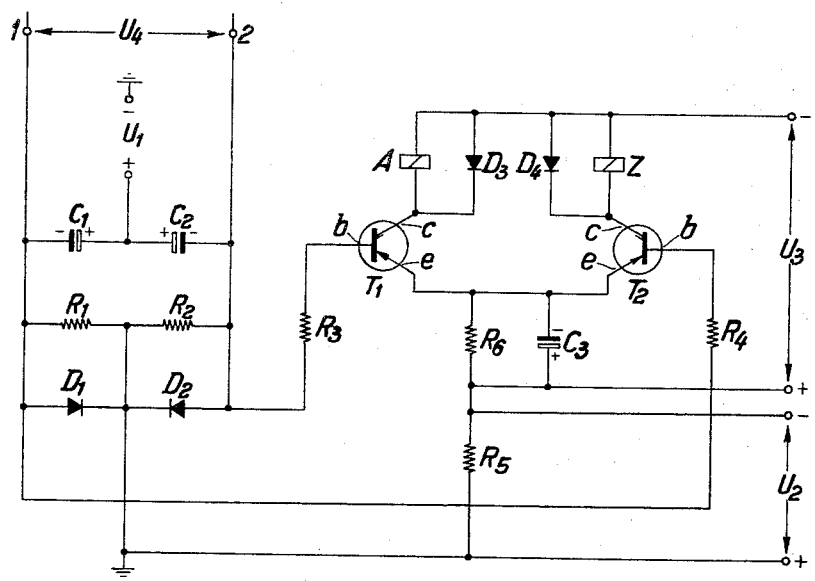

United States Patent Office 3,238,380
Patented Mar. 1, 1966

3,238,380
POWER END STAGES IN ADJUSTING MEMBERS OF CONTROLS
Jochen Schaube, Berlin, Germany, assignor to Dr. Ing. Erich Kieback and Dipl. Ing. Paul Peter, both of Berlin, Germany
Filed Mar. 21, 1963, Ser. No. 267,060
Claims priority, application Germany, Mar. 27, 1962, K 46,284
9 Claims. (Cl. 307—88.5)

The invention relates to a power stage for use in control circuits utilizing semiconductor switching elements, equivalent control elements, such as silicon controlled rectifiers or thyristors, responsive to a D.C. control voltage changing both its polarity and magnitude and providing for three stable switching conditions, for example FORWARD-ON; STOP or OFF; and REVERSE-ON.

The control signal switching threshold for the switching ON in either sense need not coincide with that for switching OFF. Three distinct stable conditions such as, for example, "forward," "stop," "reverse" must be produced as a function of the magnitude and sign of the control signal. An additional condition for operation is that the two extreme conditions ("forward," "reverse") must be mutually exclusive, that is, interlocking is required.

The invention may be used, for example in heater and air conditioning controls where operation of the controlled unit (heat-off-cool) should be at full power when a sensing element reaches its response threshold value; and the units must not receive the "forward" and "reverse" signals simultaneously. The present control unit may be operated directly by a sensed control signal for example from a Wheatstone bridge; the output of the control unit of the present invention may control the controlled unit directly, or through relays.

It is difficult to realize control in three modes (e.g. forward-stop-reverse) with conventional semiconductor elements because these have only two stable conditions (OFF, ON) as a function of the control signal. For this reason, in order to produce with reliability mutual exclusion, and three modes, three, four or six such elements may be necessary.

The present invention provides simple means for realizing three different stable switching conditions. According to the invention only two, inherently bistable current control members (such as silicon controlled rectifiers, e.g. thyristors) are used. Their inputs are connected to be mutually exclusive, and they receive control voltage from an extraneously controlled circuit, which changes in polarity and amplitude. The base-emitter (or gate-emitter) circuits are biased by a special voltage, whilst the collector-emitter (power) circuits are connected, on the collector side preferably, to non-capacitive or low-capacitive loads, such as relay coils. On the emitter side they are all connected to a pulsating, for example square wave voltage.

According to a preferred embodiment of the invention, the two emitters are connected one with the other, and through a bias resistor with the center tap of a current divider. When one of the two controlled rectifiers becomes conductive, the current is utilized to increase the control voltage by applying a fraction of the voltage occurring across the associated resistance of the divider to increase the control potential thus to assist in stabilizing the conductive condition of the controlled rectifier, even if the applied control signal decreases to a value merely above the striking voltage and just sufficient for the continued conductivity of the controlled rectifier. In case of a further reduction of the control voltage, however, this additional fractional voltage drop across the resistance of the divider drops instantaneously and approaches zero value, so that the controlled rectifier member is switched off, for example at the next half wave. The control voltage if it remains at a certain level below the striking voltage, is then determined only by the applied control signal.

Further features, details and advantages of the invention will become apparent from the following description with reference to the accompanying drawing, showing an embodiment of the invention.

Control voltages varying in magnitude and polarity, $U_4$, are connected to inputs 1, 2, which are bridged by a voltage divider formed of equal ohmic resistances $R_1$ and $R_2$, and blocking members, consisting for example of diodes $D_1$, $D_2$. A pair of current control members $T_1$, $T_2$, are connected to receive the control signal. The current control members $T_1$, $T_2$ are bistable elements, preferably silicon controlled rectifiers (SCR), but may as shown, be switching transistors which are preferably matched to have like characteristics. They have a collector $c$, an emitter $e$, and a control electrode or base $b$. So long as the voltage applied to base, or gate electrode $b$ does not reach a threshold voltage, no current flows between the collector $c$ and emitter $e$. When a threshold limit is exceeded, the flow starts immediately and ceases only when either the collector potential disappears, or when the collector current drops below a certain value. When a pulsating D.C. voltage is applied as collector potential, suitable potential changes at the control electrode $b$ enable switching and thus control of the SCR or transistor.

Where maximum power output is important, the collector voltage preferably is a square wave. Although this will make ignition angle control difficult, the power yield will be at maximum with a given supply voltage.

In the present case it will be assumed that the load consists each of an inductive and ohmic load, that is coils of relays A and Z, although any other load, such as glow lamps, transistors, relays, D.C. motors and the like, may be used, insofar as they do not have excessive capacitive components. Capacitive loads require special protective measures, such as the series connection of a resistor with negative temperature coefficient or an inductance to the load resistance.

The arrangement according to the diagram is D.C. voltage controlled. The control voltage $U_4$ may be derived by any sensor known in the art, for example from a bridge circuit (not shown) supplying the control voltage $U_4$ to the inputs 1, 2. To sense temperature, one arm of such a bridge contains a negative temperature coefficient resistance. This bridge circuit is sufficient mainly for small requirements and is characterized by its simplicity. When higher demands regarding the sensitivity and accuracy are placed on the sensing device, then the sensed signal may be applied to a preamplifier, preferably a stabilized A.C. amplifier.

The bridge places a low load on the input source, particularly after the ignition of one of the two elements $T_1$, $T_2$ so that the measuring or response accuracy of the sensor, or its amplifier is not affected and a high uniformity of response is obtained.

The particular source of control signals is not part of the present invention and any suitable means supplying D.C. voltages to the circuit, varying in polarity and magnitude, may be used. According to the polarity of the control voltage $U_4$ applied to the inputs 1, 2, the left or the right element $T_1$ or $T_2$ is energized. For example, the polarity of the control signal may be such that the input terminal 1 has a positive and the input 2 a negative potential. Then the diode $D_2$ is effective in the blocking direction and the diode $D_1$ is rendered conductive. Thus the diode $D_2$ presents a large resistance, while the diode $D_1$ has a small resistance, causing the resistor $R_1$ to be effectively shortcircuited. Substantially the whole control voltage $U_4$ is therefore built up across the resistor $R_2$ and available as control D.C. voltage for the element $T_1$. The base (or gate) $b$ of thyristor $T_1$ is negative relative to the emitter $e$.

If the polarity of the applied control voltage is reversed, that is to say, input 1 is negative and input 2 positive, the diode $D_1$ is effective in the blocking direction and the diode $D_2$ in the conductive direction, so that the control voltage appears across resistor $R_1$ and the base $b$ of the element $T_2$ is negative.

The above examples assume negative control voltages across the base (gate) emitter path. The circuit of course can also use positive control voltage element, as will be apparent to those skilled in the art.

The input circuit it may be insures that the bases $b$ of the elements $T_1$ and $T_2$ will never be affected simultaneously by a D.C. control voltage.

Between the inputs 1, 2 there are capacitors, preferably electrolyte capacitors $C_1$, $C_2$, arranged to bridge inputs 1, 2, if the input control voltage $U_4$ has A.C. components. Since the polarity of the control voltage $U_4$ changes, the electrolyte capacitors are polarized by a sufficently high bias D.C. voltage $+ U_1$. This polarizing voltage $U_1$ may be taken from a separate full-wave rectifier (not shown). A residual waviness may be intentionally left on this bias voltage, to aid in firing, or switching of elements $T_1$, $T_2$. This residual waviness superimposed onto the polarizing voltage $U_1$ is effective, by vitrue of the symmetrical supply through the electrolyte capacitors $C_1$ and $C_2$ at the inputs 1 and 2.

The control electrodes are connected over isolating resistances $R_3$, $R_4$, which drop part of the polarizing voltage $U_1$. Still, firing of $T_1$ or $T_2$ may be effected with sufficiently large control D.C. voltages $U_4$.

The D.C. control voltage must now overcome a certain threshold before the element $T_1$ may switch. This threshold is necessary, since semiconductor elements generally, and SCR's or switching transistors in particular have comparatively widely varying ignition thresholds. This variation between elements would either necessitate the separate adjustment of every apparatus or the response threshold would differ from one apparatus to another. For positive control of the OFF state, a D.C. voltage $U_2$ is provided which is connected across a resistor $R_5$ to provide a constant voltage drop thereacross in such sense (negative to earth) that the base-emitter paths of the elements $T_1$ and $T_2$ are positively biased and therefore normally blocked. When the elements $T_1$ and $T_2$ are deenergized, the negative terminal of the D.C. voltage $U_2$ is applied through the emitter resistor $R_6$ to the emitter terminals of $T_1$ and $T_2$, whilst the positive terminal of $U_2$ is applied through the resistors $R_1$, $R_4$ and $R_2$, $R_3$ to the base terminals of $T_1$ and $T_2$. So long as the control voltage $U_4$ is zero, the full voltage is applied between the base-emitter terminals of $T_1$ and $T_2$, and both elements $T_1$ and $T_2$ are OFF.

When the control voltage $U_4$ assumes values differing from zero, a control D.C. voltage is built up, according to the polarity of $U_4$, across the resistor $R_1$ or $R_2$. A pulsating, or square wave voltage $U_3$, connected across elements $T_1$ and $T_2$, and their loads A and Z are provided. Let it be assumed by way of example that the voltage across the input 2 rises to such a negative potential (against earth) that the positive bias created by the voltage $U_2$ at the control electrode of the element $T_1$ is just overcome. Thus a certain, slightly higher D.C. control voltage will be at the resistor $R_2$ and the diode $D_2$, and the base-emitter voltage of $T_1$ becomes slightly negative. As soon as the necessary iginition current of the control electrodes $b$ is reached the element $T_1$ becomes conducting. The internal resistance of the element $T_1$ drops thereby to very low values, amounting only to a few ohms so that the supply voltage $U_3$ in the emitter-collector circuit is almost fully effective in the relay winding A, whilst the voltage between the emitter and collector terminals of the element is reduced to the internal voltage drop of a few tenths of a volt.

The polarity of the supply voltage $U_3$ is impressed onto the emitter-collector circuit of the element T, $T_2$, such that its positive pole is connected through the resistor $R_6$ to the emitter $e$, and its negative pole through the relay coils A, Z to the collector $c$ of the element $T_1$. Due to the breakthrough characteristics of element $T_1$, when conductive, the major part of the voltage drop across the element will be between the base and emitter terminals. The base will be negative with respect to the emitter by a value which is a multiple of the slight potential necessary to fire, or switch the element, and initially supplied by the control voltage. This voltage generates a current in this circuit: starting from the emitter of the element $T_1$ through the resistors $R_6$, $R_5$, the parallel circuit of the resistor $R_2$ and the diode $D_2$, and finally through the protective resistor $R_3$ to the base terminal of the element $T_1$. This current produces across the parallel circuit of $R_2$ and $D_2$ an additional voltage drop which is added to the voltage occurring at these members by the control voltage $U_4$, because it has the same polarity. Owing to this voltage rise across the resistor $R_2$ and the diode $D_2$, the actually effective control voltage $U_4$ rises by an amount $\Delta U_4$, although the voltage drop across $R_3$ has increased. By this sudden increase voltage at terminal $b$ of element $T_1$ to $U_4+\Delta U_4$, a higher negative potential between the base and the emitter is maintained and thus the switched ON condition of the element $T_1$ add relay A are maintained so long as a control signal $U_4$ obtains.

The additional voltage drop $\Delta U_4$ across the resistors $R_2$ and the diode $D_2$, produced by the voltage between the base and emitter terminals of $T_1$ reduces the load on the control voltage source $U_4$, since now only a part of the D.C. control voltage has to be supplied thereby and thus also only a part of the control current necessary to maintain conduction, i.e. the holding current. The load on the control current source $U_4$ may be reduced to a value until, with voltage $U_4+\Delta U_4$ across terminals E and $b$, the holding current for the element $T_1$ and relay A just flows. Upon a further reduction of the control voltage, that is when the control current flowing through the control electrode drops below the holding current, element $T_1$ reverts to its high resistance state. The additional voltage drop $\Delta U_4$ across the resistors $R_2$ and the diode $D_2$ then disappears instantaneously. The control voltage $U_4$ assumes now the value determined exclusively by the control signal, and the load on the control voltage source $U_4$ rises again to the value represented by the connected external circuit before the ignition of the element $T_1$.

The load current, starting after the ignition of the element $T_1$, flows through the positive connection of $U_3$, through the emitter resistor $R_6$ to the emitter terminal of the element $T_1$. The voltage drop across the resistor $R_6$ is, therefore, only a fraction of $\Delta U_4$, with the emitter terminal of $R_6$ being negative with respect to the earth side of $R_6$. The continuous bias on the resistor $R_5$ due to potential $U_2$ has the same polarity as the voltage across the emitter resistor $R_6$, and with respect to the base potential of the element $T_2$, it has the same effect as the voltage across $R_5$. Thus with the energization of element $T_1$, the blocking voltage on element $T_2$ is increased by the amount of the voltage drop across the emitter resistor $R_6$. This presents a further safeguard against the accidental ignition of element $T_2$ while element $T_1$ is energized.

The reliable ignition of the element $T_1$, for example is supported by the capacitor $C_3$ located in parallel to the emitter resistor $R_6$. Without this capacitor $C_3$, conduction of the element $T_1$ would give rise, due to the flow of the load current through $T_1$, of a feedback voltage across the emitter resistor $R_6$, which might cause deenergization of element $T_1$ due to variation of its characteristic from design specifications as the collector voltage $U_3$ goes through a reversely poled half cycle of the thyristor $T_1$.

The capacitor $C_3$ is essentially uncharged until the energizing of, say $T_1$. At the beginning of the flow of the load current, the capacitor $C_3$ acts as a short-circuit and allows the voltage across the emitter resistor $R_6$ to reach its final value only with a delay. Thus, the feedback is absent at the beginning of the ignition, whilst it is fully effective subsequently. This ensures the ignition of $T_1$ also with larger variations of its ignition characteristic.

The load circuit, consisting of the relay coils A or Z, each bridged by a diode $D_3$ or $D_4$, the elements $T_1$ or $T_2$ and the emitter resistor $R_6$ is supplied with a pulsating direct voltage or a square wave voltage, $U_3$. Thus, conduction of a conductive element may cease when the collector supply voltage $U_3$ becomes zero. The two diodes $D_3$ and $D_4$ operate, as known per se, as extinguishing diodes for the relay coils A and Z, and prevent the formation of inductive voltages which would prevent the actual voltage across the collector terminal of $T_1$ or $T_2$ from becoming zero, which might inhibit the de-energizing of the respective element. However, so long as the control voltage $U_4$ with the partial ignition voltage produces, for example, at the base-emitter path of $T_1$ that is across the parallel circuit $R_2$, $D_2$ a sufficiently high negative control D.C. voltage for the holding current, the base-emitter voltage of the element $T_1$ also maintains its negative value so that with the renewed pulse, or half-wave of the polarity indicated on the figure of $U_3$ element $T_1$ is again rendered conductive. Element $T_1$ will be extinguished only when the negative D.C. control voltage across $R_2$, $D_2$ has dropped so far that the control current flowing through the control electrode $b$ is below the holding current for at least one period of the selector supply voltage, and the relay A will be de-energized with such delay as is characteristic thereof. With the extinction of $T_1$, there disappears also the additional voltage drop generated across $R_2$, $D_2$ by the output current, and the control voltage drops instantaneously to the voltage value $U_4$ supplied at the input. This value of the control voltage $U_4$ is smaller than the control voltage at base $b$ of $T_1$ necessary for conduction, because the voltage drop $\Delta U_4$, caused by the current through element $T_1$ across $R_2$ and $D_2$ had aided the signal voltage $U_4$. Thus, the reduction of $U_4$ by almost the amount $\Delta U_4$ may occur without the negative potential at the base of $T_1$ dropping below the minimum value necessary to maintain the holding current. However, with the disappearance of the load current through the element $T_1$, the voltage at the base $b$ drops by an amount equivalent to $\Delta U_4$, and this suddenly so that re-ignition of the element $T_1$ is reliably prevented. Since the capacitor $C_3$ is still charged to the full value of the feedback voltage at the moment of extinction of $T_1$, this voltage increases the positive blocking voltage of the base of $T_1$ and is effective until the discharge of $C_3$ through the resistor $R_6$ which has a relatively low ohmic value as additional safeguard against undesired re-ignition of the element $T_1$.

After the dying down of the voltage drop across the resistor $R_6$, the blocking voltage across the resistor $R_5$, reduced by the (opposite) residual voltage drop across $R_2$ $D_2$, caused by the control voltage $U_4$, is alone effective at the base of the element $T_1$. The potential of the base terminal of $T_1$ has now again a positive sign so that the element $T_1$ is again reliably blocked. By eliminating the feedback voltage across the resistor $R_6$ and the capacitor $C_3$, the base of the element $T_2$ is also brought into the normal blocking condition.

Assuming now, that the ignition voltage is about 1 volt, the processes may be summarized as follows, with the following voltage values:

(1) Design Ignition at $U_4 \geq 1.0$ v.
(2) Consequent to ignition; $\Delta U = .5$ arises, and $U_4 + \Delta U_4 = 1.0 + 0.5$ v. $\gg$ 1.0 v. = ignition voltage;
(3) After current flow through coil A, $U_4$ drops and thus $U_4 + \Delta U_4$ drops.
(4) Before switching off: $U_4 + \Delta U_4 = 1.05$ v. (0.05 v. $>$ design ignition voltage).
(5) At switching off: $U_4 + \Delta U_4 = 1.0$ v., that is $.5 + .5$ v.
(6) After switching off: $U_4 + 0 = 0.5$ v.

This summary is valid under the assumption that $R_3$ (or $R_4$) $+ R_5$ and $R_6 \ll R_2$ (or $R_1$).

What I claim is:

1. A control circuit supplying the three functions ON–1; OFF; and ON–2 in accordance with polarity and magnitude of a control signal, so that when the control signal has either positive or negative polarity and exceeds a predetermined magnitude, the control function ON–1, or ON–2 are obtained, and then the control signal drops below said predetermined magnitude, the control function OFF is obtained, comprising a balanced input circuit including a pair of resistances serially connected across the input and a pair of serially connected oppositely poled unilateral conducting devices, connected in parallel to said resistances, the common terminals of said serially connected resistances and diodes, respectively, being electrically joined and forming a common terminal for said control circuit; a pair of semiconductor elements, each having a pair of output circuit electrodes, and a control electrode, the control electrode of said semiconductor elements being connected to a respective other terminal of said resistances and diodes; means biasing both said semiconductor elements to non-conductive condition; a power output circuit including a power source and a pair of loads, each connected to an output circuit electrode of a respective semiconductor element; and a common circuit connecting the other output circuit electrodes of both said semiconductor elements to said power circuit.

2. A circuit as claimed in claim 1, said power source being of such polarity that upon conduction of any one of said semiconductor elements, the voltage drop due to the additional current through the respective serially connected input resistance is in a direction tending to maintain conduction of said semiconductor element, whereby continuity of conduction through said element is assured.

3. Circuit as claimed in claim 1, including a pair of electrolytic capacitors connected to the input resistances, and a polarizing potential having an A.C. component connected to said condensers.

4. Circuit as claimed in claim 3, said electrolytic capacitors being connected across said pair of serially connected input resistances.

5. Circuit as claimed in claim 3, a protective resistor connected in circuit from said serially connected resistances and diodes to a respective control electrode of the respective semiconductor element.

6. Circuit as claimed in claim 1, said means biasing both said semiconductor elements into non-conductive condition, comprising a source of bias connected to place both said semiconductor elements in non-conductive condition, a resistor common to both said semiconductor elements, said biasing source being connected to said common terminal for said control circuit and to said common resistor to provide for blocking voltage and to positively inhibit conduction of both semiconductor elements and thus provide for positive OFF condition.

7. Circuit as claimed in claim 1, said pair of serially connected input resistances each having a value large with respect to the total value of other resistances in the circuit including said input resistances, when a respective semiconductor element is in conductive condition.

8. Circuit as claimed in claim 1, wherein said common circuit connecting the other output circuit electrodes of both said semiconductor elements into the power circuits includes a coupling resistance having a value small with respect to the value of any one of said serially connected input resistances so that the voltage drop due to load current over said coupling resistance is small with respect to the additional voltage drop arising during conduction of a respective semiconductor element across the respective one of the serially connected input resistances.

9. Circuit as claimed in claim 8, a condenser connected across the coupling resistance and of such value to introduce a time delay into said voltage drop across said coupling resistor to prevent reducing the effect of the potential across the respective one of said serially connected input resistances upon initiation of conduction of a semiconductor element.

References Cited by the Examiner
UNITED STATES PATENTS

| 3,091,704 | 5/1963 | Bashor et al. | 307—88.5 |
| 3,127,550 | 3/1964 | Gilbreath et al. | 307—88.5 |

ARTHUR GAUSS, *Primary Examiner.*

J. BUSCH, *Assistant Examiner.*